United States Patent [19]

Ueda et al.

[11] Patent Number: 5,023,534
[45] Date of Patent: Jun. 11, 1991

[54] AUTOMATIC GUIDED VEHICLE, METHOD FOR POSITIONING SAID VEHICLE, AND LOADING TABLE HAVING POSITIONING DEVICE

[75] Inventors: Satoshi Ueda, Itami; Masahiro Sudare, Higashi-Osaka; Yasuyuki Suyama, Uji; Kazuhiko Kishimoto, Nara; Kenshi Suzuki, Takatsuki; Shiroh Inoue, Daito; Shunji Sakura, Kyoto, all of Japan

[73] Assignee: Tsubakimoto Chain Co., Osaka, Japan

[21] Appl. No.: 283,400

[22] Filed: Dec. 22, 1988

[30] Foreign Application Priority Data

Jan. 19, 1988 [JP] Japan ................................ 63-10406
Jan. 22, 1988 [JP] Japan ................................ 63-12841
Jan. 22, 1988 [JP] Japan ................................ 63-12842

[51] Int. Cl.$^5$ .............................................. B64C 13/18
[52] U.S. Cl. .................................... 318/587; 318/640; 414/590; 414/589; 414/495
[58] Field of Search ................ 318/587, 640; 414/590, 414/589, 495

[56] References Cited

U.S. PATENT DOCUMENTS 4,682,926  7/1987  Chambers et al. ..................... 414/11
4,703,240 10/1987  Yoshimoto et al. ................. 318/587
4,796,198  1/1989  Boultinghouse .................... 364/513

Primary Examiner—William M. Shoop, Jr.
Assistant Examiner—Saul M. Bergmann
Attorney, Agent, or Firm—Townsend and Townsend

[57] ABSTRACT

An automatic guided vehicle comprising a loading table provided with positioning motors for three directions including two on a horizontal plane and a rotational one around a vertical axis and also with optical sensors for detecting positioning marks at stop positions so that positioning of the automatic guided vehicle at a stop point thereof may be ensured in high precision, and a method for positioning the automatic guided vehicle without attendant with high precision in such manner that the optical sensors detect degrees of deviation between the guided vehicle and the positioning marks, and positioning motors are driven after computing three-directional positioning correction values based on the result of detection or reducing deviation at the loading table.

9 Claims, 6 Drawing Sheets

AUTOMATIC GUIDED VEHICLE, METHOD FOR POSITIONING SAID VEHICLE, AND LOADING TABLE HAVING POSITIONING DEVICE

BACKGROUND OF THE INVENTION

1. Field of the Invention

The present invention relates generally to an apparatus and method for positioning an automatic guided vehicle having a loading table. More specifically, the present invention relates to an apparatus and method for using the loading table of the automatic guided vehicle to compensate for detected positioning errors of the automatic guided vehicle.

2. Description of the Prior Art

Automatic guided vehicles have greatly been developed as nucleating apparatus of factory automation for these several years.

The conventional automatic guided vehicle has been provided with a table which is loaded with articles to be conveyed, disposed on the top of the vehicle, and conveys the load of articles to stations provided for various processes. The articles are automatically transferred from the automatic guided vehicle to every station by a unloading device provided in the station.

On the other hand, linear and angular degrees of precision in stoppage of the automatic guided vehicle are in the order of ±10 mm in the advance direction as well as in the direction intersecting therewith and ±1° or so in the rotational direction around a vertical axis, respectively, and relative degrees of precision in stoppage between the unloading device and the loading table have an equal value with those described above, because of dependence thereof on the degree of precision in stoppage of the automatic guided vehicle. Together with precision error at the time of stoppage, deviation occurs between relative stop positions of said unloading device and of the loading table and regular relative stop positions. Therefore, it is required to provide a structure for eliminating said positional deviation for the unloading device or the automatic guided vehicle or to improve stoppage precision of the vehicle such as in the case of automatic unloading of articles in the semiconductor manufacturing factory.

As known measures for improving stoppage precision, there is positioning means of such structure that a plurality of hydraulic jacks are provided for the automatic guided vehicle, conical holes are drilled in rod parts of the jacks, a plurality of conical positioning projections to be engaged with said holes are provided at the regular stop positions on the floors of every station correspondingly to setting positions of the hydraulic jacks, and, upon stoppage of the automatic guided vehicle at the station, the hydraulic jacks are moved forward to be fitted on the respective positioning projections for positioning the vehicle. Thus, the automatic guided vehicle is lifted the floor and positioned in the correct position.

However, in said measures, the positioning projections are obstructive to running of the vehicle and a large number of additional devices such as a hydraulic generating source are required, thereby inviting price increase and more complicated structure. Further, such measures as mentioned above, which determine a position of the vehicle while depending on engagement of holes with projections, degrades positioning precision owing to advanced wear of holes and projections, whereby particles of worn parts are turned into dust and the vehicle could not be employed in circumstances where the degrees of positioning precision and purification are limited such as in the semiconductor manufacturing factory.

Unloading devices, if each provided with a structure for eliminating the aforesaid positional deviation, necessitate a large number of such structures because they are arranged in every station, thereby leading to price increase of the whole system.

In addition, when providing a structure for eliminating the positional deviation for the automatic guided vehicle, it is presumable that positioning in the advance direction of the vehicle and in the direction intersecting therewith depends on ball screws and that positioning in the rotational direction around a vertical axis depends on rotation of gearing mechanism, however, the mechanism using ball screws and gearing has such problems as requiring wide space for installation and a large number of parts, weight increase, and higher manufacturing cost on account of requirements for leveled up precision in component parts to obtain higher precision in the ball screw and gearing mechanisms attended with backlash. The use of the ball screws and gearing mechanism causes particulated dust of worn parts and requires dust-proof countermeasures over a wide range.

SUMMARY OF THE INVENTION

The present invention has been designed in order to solve the problems in the conventional art and a first object thereof is to provide an automatic guided vehicle, while preparing a loading table having positioning means in three directions including two on a horizontal plane and a rotational one around a vertical axis for the automatic guided vehicle, which has a simple in structure and is capable of determining relative positions of the loading table and a unloading device at low cost and with high precision.

A second object of the present invention is to provide a method for determining relative positions of the unloading device and the loading table by means of a simple structure without attendant, at low cost, and with high precision by detecting positioning marks provided at stop positions and positional deviation between the guided vehicle and the positioning marks, computing positioning correction values in order to eliminate said deviation, and positioning the loading table on the basis of computed positioning correction values.

A third object of the present invention is to provide a loading table capable of determining a stop position with high precision at low cost, nevertheless by using component parts with low precision, without polluting a clean atmosphere by using eccentric cams preloaded upon outer peripheries thereof for positioning the loading table of the automatic guided vehicle in three directions including two on a horizontal plane and a rotational one around a vertical axis.

The above and further objects and features of the invention will more fully be apparent from the following detailed description with accompanying drawings.

DESCRIPTION OF THE PREFERRED EMBODIMENTS

The present invention will be described in detail with reference to the drawings showing embodiments of the invention.

Figure 1:
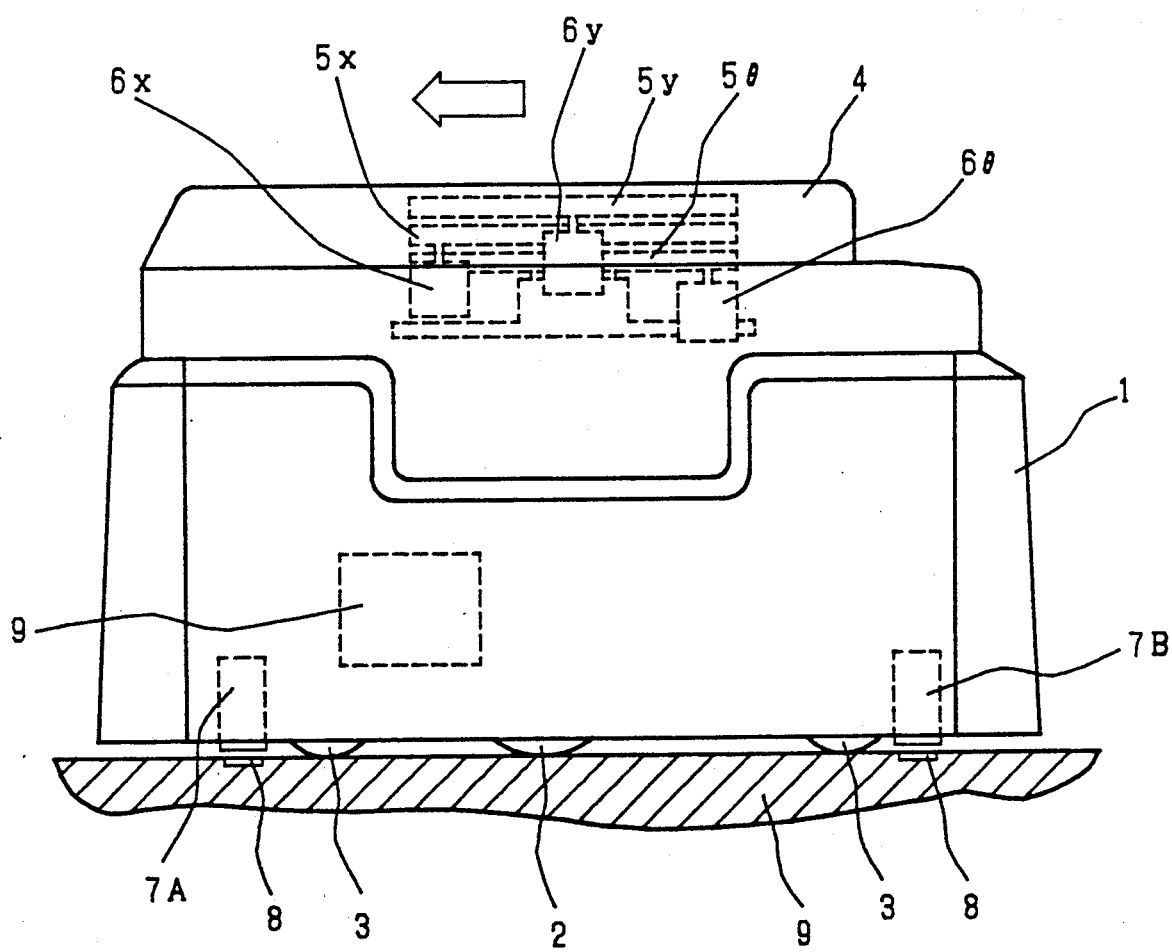
FIG. 1 is a view of the left side of an automatic guided vehicle of the present invention.

FIG. 1 is a view showing the left side of an automatic guided vehicle according to the present invention, in which the advance direction of the vehicle is shown by a hollow arrow mark.

In the drawing, the reference numeral 1 indicates a body of the vehicle supported by a pair of driving wheels 2 disposed on the right and left sides of the vehicle (the one on the right side is not shown) and four subsidiary wheels 3 on the front, rear, right, and left sides (the two on the right side are not shown). The driving wheels 2 are fixed to the right and the left sides of the central part of the body 1 while appropriately spaced from each other and coaxially connected to respective driving motors not shown, and the body 1 is steered with individual driving of the motors whereas driven forward and rearward with simultaneous driving. The subsidiary wheels 3 are fixed to the body 1 at the front, rear, right, and left sides thereof rotatably around respective vertical axes while appropriately spaced from each other.

A loading table 4 for loading with articles to be conveyed is provided on the top of the body 1 coaxially therewith and fixed to the body 1 displaceably and rotatably with respect to the body 1 in three directions with positioning means $5x$, $5y$, and $5\theta$ which are disposed in the central part of the body 1 and positioned in three directions including two in the advance direction of the body 1 and the direction intersecting therewith, and the rotational one around the vertical axis of the body 1, respectively. Positioning means $5x$, $5y$, and $5\theta$ can be driven by driving parts $6x$, $6y$, and $6\theta$, respectively, for driving in the respective three directions.

On the other hand, optical sensors $7_A$, $7_B$ each comprising an industrial TV camera for detecting a stop position of the body 1 are downwardly fixed to the central part of the body 1 at the front and rear thereof each being distant by length L from the center of the body 1, which indicate a stop position of the body 1 for each process with the optical sensors $7_A$, $7_B$ which pick-up images of two circular black positioning marks 8 on the centers of white squares on the floor and spaced from each other at a distance equal to that between the optical sensors $7_A$, $7_B$. A positioning control device 9 which emits driving signals correspondingly to positions of the detected positioning marks 8 toward the driving parts $6x$, $6y$, and $6\theta$ is incorporated in the body 1.

Figure 2:
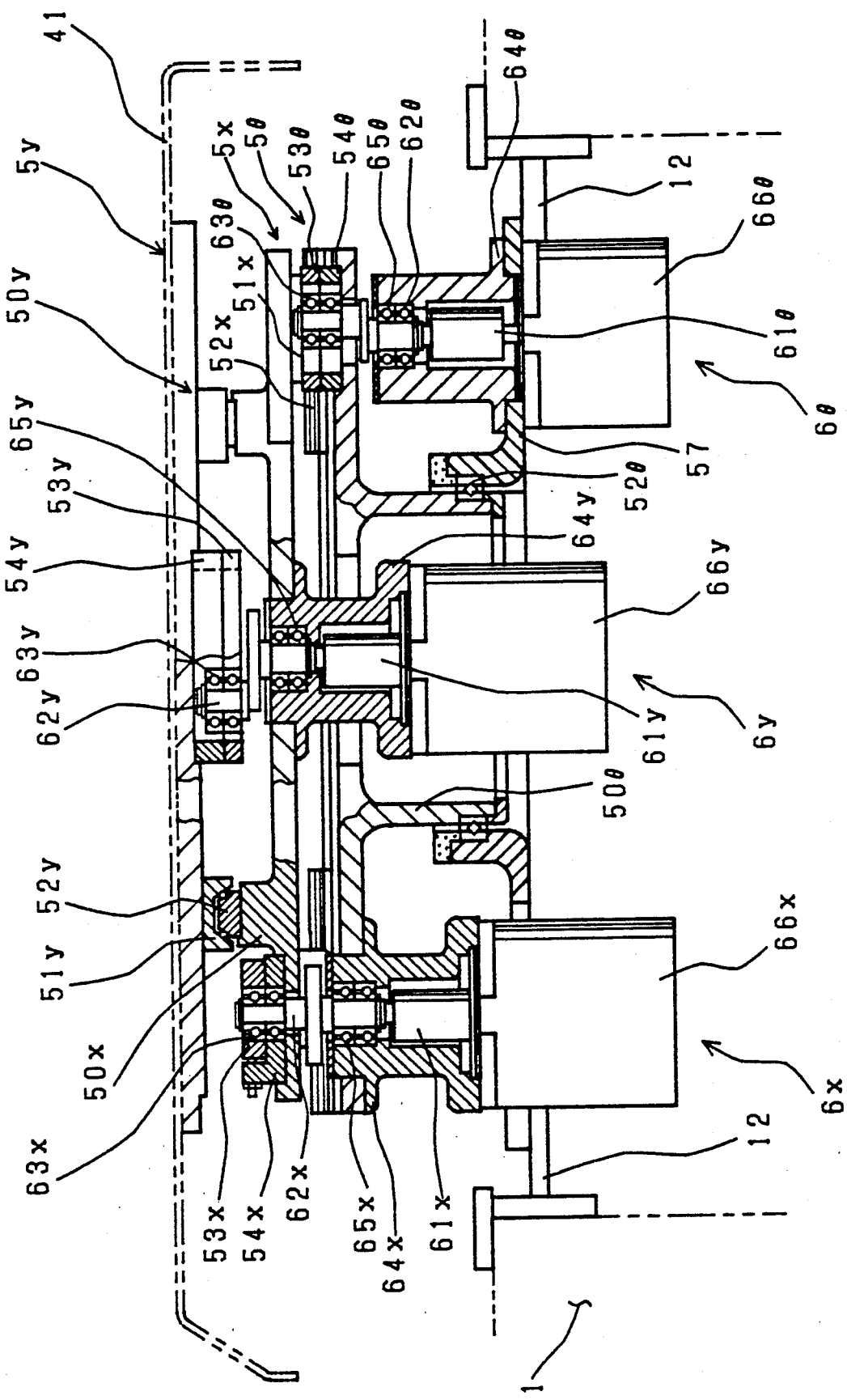
FIG. 2 is a partially broken side view of positioning means for a loading table.

FIG. 2 is a partially broken side view showing positioning means each provided with a driving part for the loading table, wherein positioning means $5x$, $5y$, and $5\theta$ are fixed to the central part of the body 1 at the front and the rear thereof and a base 57 thereof are tightly fixed to two brackets 12, 12, each in such a shape that a square flat plate is secured to the center of an inverted-L-shaped vertical member, which extend longitudinally intersecting the advance direction of the body 1.

The base 57 has a shape like a regular square flat plate having sides slightly shorter than the crosswise length of the loading table and is provided with a cylindrical boss part at the upper side of the central part. The boss part incorporates a turning bearing $52\theta$, and a driving motor $66\theta$ comprising a stepping motor for turning is fixed to the lower side of the rear central portion of the base 57 in such manner that the output shaft thereof is directed upward. To the forward end of the driving motor $66\theta$, an eccentric shaft $62\theta$ having a fixed rate of eccentricity with respect to said output shaft is connected through a flexible joint $61\theta$ and two ball bearings $63\theta$ as eccentric cams are externally fitted on the upper end of the eccentric shaft $62\theta$. A cylindrical bearing box $64\theta$ having a flange at the lower part is fixed to the upper side of the rear central part of the base 57 concentrically with the driving motor $66\theta$, and the eccentric shaft $62\theta$ is supported by two ball bearings $65\theta$ internally fitted in the upper end of the bearing box $64\theta$, whereby a turning table $50\theta$ that will be described later turns around a turning bearing $52\theta$ correspondingly to the rate of eccentricity of the eccentric shaft $62\theta$.

A downwardly directed and centrally disposed boss part of the turning table $50\theta$ in the shape of a flat plate whose external appearance is almost the same as that of the base 57 is fitted into the inner ring of the turning bearing $52\theta$ and the turning table $50\theta$ can be rotated by the turning bearing $52\theta$ while centered thereat in the rotational direction (hereinafter referred to as $\theta$ direction) around the vertical axis of the body 1. A cylindrical bearing box $64x$ having flanges at the upper and lower ends is fixed to the lower part of the front central portion of the turning table $50\theta$ and a driving motor $66x$ comprising a stepping motor for displacement in the back-and-forth direction (hereinafter referred to as x direction) is fixed to the lower flange in such manner that the output shaft of the motor is directed upward. To the forward end of the driving motor $66x$, the eccentric shaft $62x$ having a fixed rate of eccentricity with respect to the output shaft of the driving motor is connected through the flexible joint $61x$, and two ball bearings $63x$ as eccentric cams are externally fitted on the upper end of the eccentric shaft $62x$. The eccentric shaft $62x$ is supported by two ball bearings $65x$ internally fitted into the upper part of the bearing box $64x$ and a movable table $50x$ that will be described later runs in the x direction correspondingly to the rate of eccentricity of the eccentric shaft $62x$. Four displacement guides $52x$ comprising rail parts of the linear guides are fixed to the turning table $50\theta$ at the front, rear, right, and left sides thereof while appropriately spaced from each other so that the longitudinal direction thereof extends along the direction approximately agreeing with the x direction of the body 1.

Figure 3:
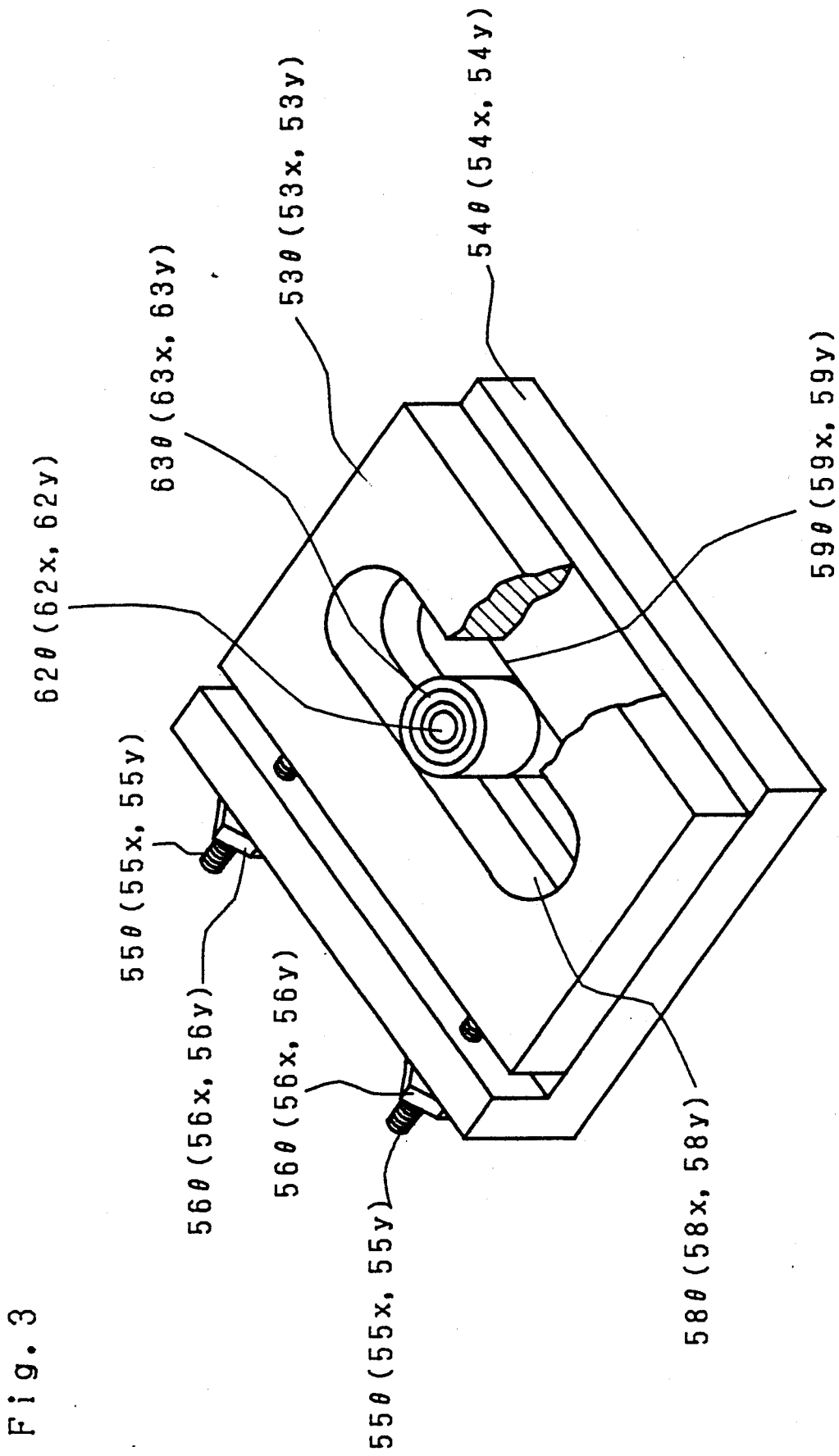
FIG. 3 is an enlarged perspective view of a state in which an eccentric cam is set.

FIG. 3 is an enlarged perspective view of a state in which an eccentric cam as driving means of the loading table is secured to an assemblage, wherein one of ball bearings $63\theta$ serving as eccentric cams is internally fitted into a square flat lower cam receiver $54\theta$ having a projection like a square bar at one end and being provided with an eccentric-cam receiving oblong groove $59\theta$ whose lengthwise direction is the same as that of said bar-like projection as well as fitted into an upper cam receiver $53\theta$ disposed above the lower cam receiver $54\theta$ and provided with the same eccentric-cam receiving groove $58\theta$ as that of the lower cam receiver 54θ, and the upper cam receiver 53θ is made slidable relative to the lower cam receiver 54θ in the direction perpendicular to the longitudinal direction of the eccentric-cam receiving groove by adjusting screws 55θ being engaged with threads provided in the projections of the lower cam receiver 54θ and spaced appropriately from each other longitudinally along the projection. The lower and upper cam receivers 54θ and 53θ, respectively, are adjusted to preload upon outer rings thereof in such a way that the outer ring of the upper one of the two ball bearings 63θ serving as eccentric cams is pressed to the side of the eccentric-cam receiving groove 58θ from which the adjusting bolts 55θ protrude whereas the outer ring of the lower ball bearing 63θ is pressed to the side of the eccentric-cam groove 59θ of the lower cam receiver 54θ opposite to said side. After such adjustment as described above, turning of the adjusting bolts 55θ is stopped with lock nuts 56θ. The lower and upper cam receivers 54θ and 53θ, respectively, are secured to the central rear part of the turning table 50θ.

On the other hand, four upper guides 51x which comprise rolling parts of linear guides engaging with moving guides 52x fixed to the turning table 50θ and rolling with respect to these moving guides 52x are fixed to the lower part of the moving table 50x so that the moving table 50x may be rolled with respect to the turning table 50θ in x direction.

The moving table 50x being flat with substantially the same external appearance as the turning table 50θ is fitted with, at the central lower part on the left side, a cylindrical bearing box 64y having fitting flanges at the upper and lower parts thereof. To the lower fitting flange, a driving motor 66y comprising a stepping motor for movement in the direction perpendicular to the advance direction of the body 1, that is, the right-to-left direction of the body 1 or vice versa (hereinafter referred to as y direction), is secured with the output shaft thereof directed upward. An eccentric shaft 62y having a fixed rate of eccentricity with respect to the output shaft of the driving motor 66y is connected to the forward end of the driving motor 66y through a flexible bearing 61y, and two ball bearings 63y as eccentric cams are externally fitted on the upper end of the eccentric shaft 62y. The eccentric shaft 62y is bearingly supported by two ball bearings 65y fitted into the upper part of the bearing box 64y and a moving table 50y that will be described later moves in the y direction correspondingly to the eccentricity of the eccentric shaft 62y. An upper cam receiver 53x and a lower one 54x being structurally identical with the upper cam receiver 53θ and the lower one 54θ, respectively, being fixed to the turning table 50θ are fixed to the upper forward central part of the moving table 50x so that the longitudinal direction of eccentric-cam grooves 58x, 59x extends in the y direction. Further, four moving guides 52y comprising rail parts of the linear guides and moving in the y direction are fixed to the front, rear, right, and left upper parts of the moving table 50x while appropriately spaced from each other. Four upper guides 51y comprising rolling parts of the linear guides are fixed to the lower part of the flat square moving table 50y so as to engage with the moving guides 52y and to adapt the moving table 50y to be rollable in the y direction. An upper cam receiver 53y and the lower one 54y engaging with the ball bearings 63y, 63y and structurally identical with the upper cam receiver 53θ and the lower one 54θ, respectively, are fixed to the left side lower central part of the moving table 50y so that the lengthwise direction of the eccentric-cam grooves 58y, 59y thereof extends in the x direction and the upper and lower ends thereof are inverted with respect to those of the upper and lower cam receivers 53θ and 54θ, respectively. A loading part 41 composing a loading table 4 for loading articles is fixed to the top of the moving table 50y.

Figure 4:
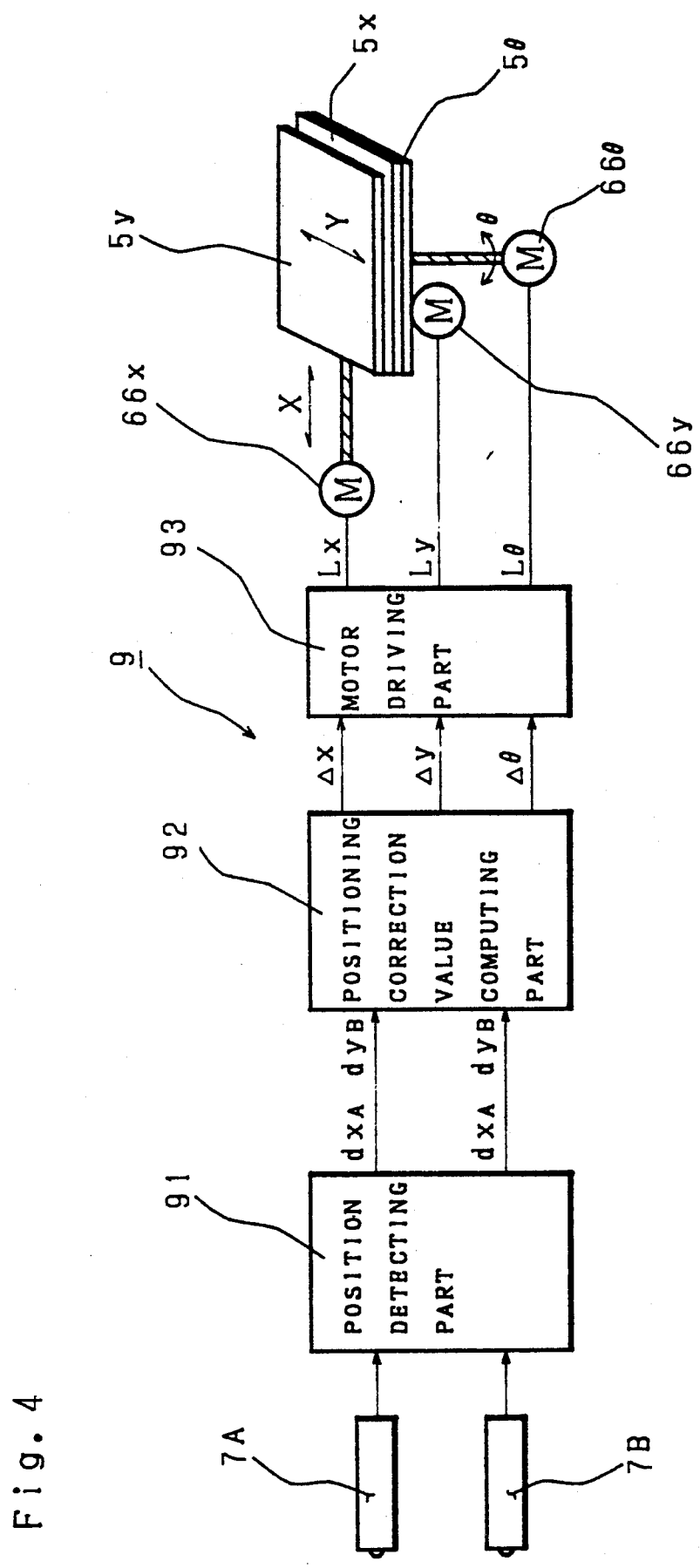
FIG. 4 is a block diagram showing the structure of a positioning control device of the present invention.

FIG. 4 is a block diagram showing a structure of the positioning control device of the automatic guided vehicle of the present invention. The positioning control device 9 is provided with a position detecting part 91 for detecting positions of the positioning marks 8 whose images have been picked up by the optical sensors $7_A$, $7_B$, a positioning correction value computing part 92 for computing values of deviation degrees between each positions $P_A$, $P_B$ of centers of visual fields of the optical sensor and each positions $P_A'$, $P_B'$ of gravitational centers of the detected positioning marks 8 and for computing positioning correction values $\Delta x$, $\Delta y$, and $\Delta, \theta$ in the direction x, y, and $\theta$ based on the computation for positioning the loading table 4 of the automatic guided vehicle in the direction which corrects said positional error, and a motor driving part 93 for memorizing relations between each computed positioning correction values $\Delta x$, $\Delta y$, and $\Delta, \theta$ and each numbers of pulses to be given to the driving motors 66x, 66y, and 66θ, respectively, and, based on the above memory, for giving fixed numbers of pulses Lx, Ly, and Lθ to the driving motors 66x, 66y, and 66θ.

A method of the present invention for computing positioning correction values to be applied to control over the automatic guided vehicle and stop position thereof will be described. The positioning correction values $\Delta x$, $\Delta y$, and $\Delta, \theta$ are to be given to the driving parts 6x, 6y, and 6θ of the loading table 4 for adapting the central position G of the loading table and a setting direction x thereof to agree with an intermediate position G' between the positioning marks 8 and the direction in which these marks are set, respectively, whereby said positional error is eliminated.

Figure 5:
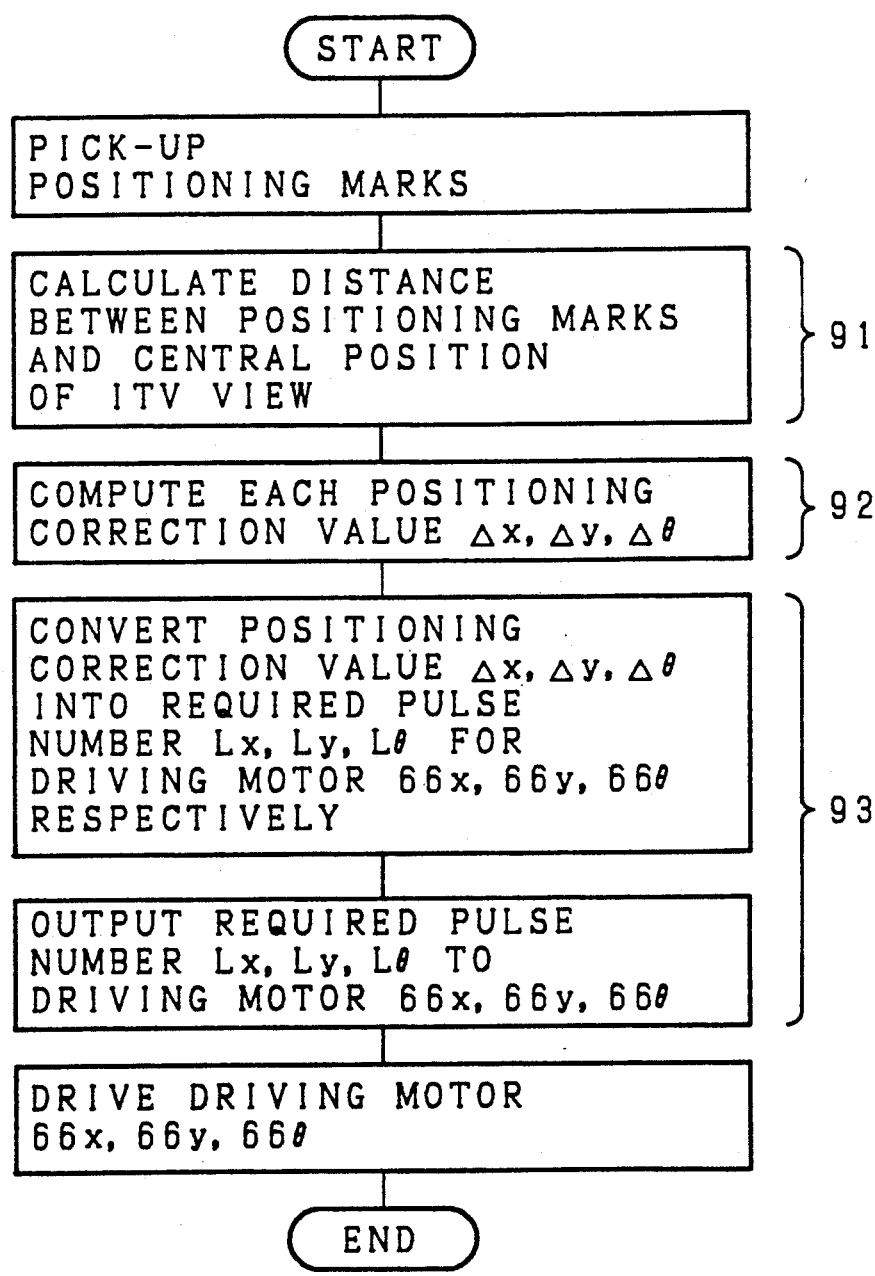
FIG. 5 is a flow chart showing the flow of control operation.
Figure 6:
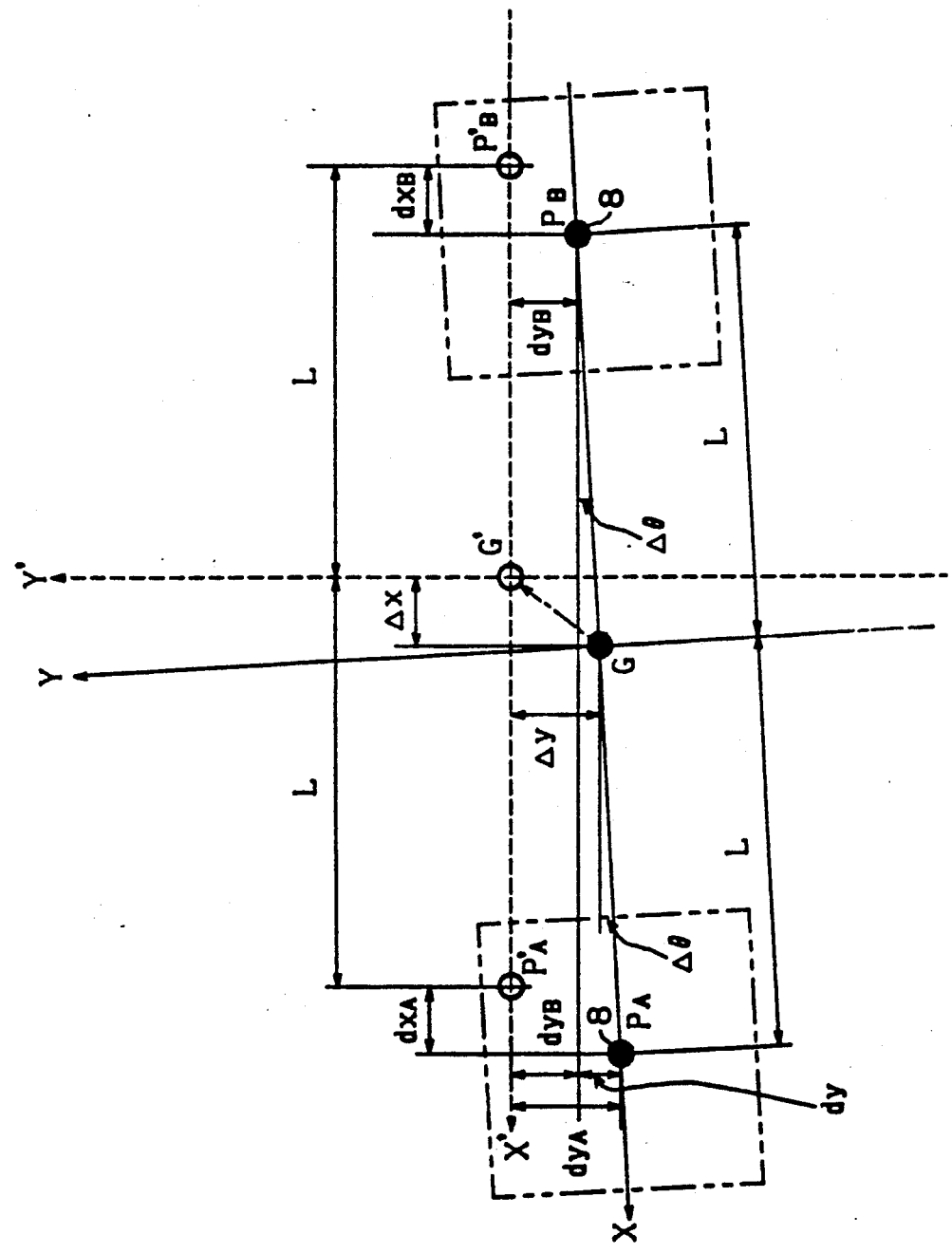
FIG. 6 is a diagram showing a method of computing values required for positioning.

FIG. 5 is a flow chart showing the flow of control process and FIG. 6 is a view showing a method for computing positioning correction values. With reference to these illustrations, the automatic guided vehicle is automatically driven by a given guiding device toward stations being provided in various processes and stopped at a position enabling black circles as centers of the positioning marks 8 to be caught in the visual fields of the optical sensors $7_A$, and $7_B$. When the guided vehicle is stopped, the optical sensors $7_A$, $7_B$ pick-up images of the positioning marks 8 and, based on the result of image picking-up, distances $d_{XA}$, $d_{YA}$, $d_{XB}$ and $d_{YB}$ between the central positions PA, PB and positioning marks $P_A'$, $P_B'$ are calculated by a position detecting part 91 in the coordinate system in which the intermediate position G' between positioning marks 8 is defined as an initial point, and setting direction of the marks as the X' axis whereas the direction perpendicular to the X' axis is defined as Y' axis. The positioning correction value computing part 92 computes positioning correction values $\Delta x$, $\Delta y$, and $\Delta, \theta$ with values of distance $d_{XA}$, $d_{XB}$, $d_{YA}$, and $d_{YB}$ obtained by the position detecting part 91, in accordance with a computing method that will be described later. The motor driving part 93 converts the positioning correction values $\Delta x$, $\Delta y$, and $\Delta, \theta$ into the required pulse numbers Lx, Ly, and Lθ for driving motors 66x, 66y, and 66θ and outputs these pulse numbers to the driving motors, thereby, the loading table 4 is positioned.

On the other hand, for computing the positioning correction values $\Delta x$, $\Delta y$, and $\Delta$, $\theta$, the above-described values of distances $d_{XA}$, $d_{YA}$, $d_{XB}$, and $d_{YB}$ are computed when gravitational centers of the positioning marks 8, 8 are taken in the visual fields of the optical sensors $7_A$, $7_B$. Positioning correction values are found in accordance with the following formulae.

$$\Delta x = \frac{d_{XA} + d_{XB}}{2} \quad (1)$$

$$d_Y = d_{YA} - d_{YB}$$

$$\Delta y = \frac{d_Y}{2} + d_{YB} = \frac{d_{YA} - d_{YB}}{2} + d_{YB} = \frac{d_{YA} + d_{YB}}{2} \quad (2)$$

$$\Delta \theta = \sin^{-1}\left(\frac{d_Y}{2L}\right) \quad (3)$$

$$= \sin^{-1}\left(\frac{d_{YA} - d_{YB}}{2L}\right)$$

where: 2L: a distance between setting positions of positioning marks 8.

Positioning correction values $\Delta x$, $\Delta y$, and $\Delta$, $\theta$ are computed in accordance with the above formulae (1) to (3) and fixed numbers of pulses Lx, Ly, and L$\theta$ corresponding to the above correction values are outputted by the motor driving part 93 to drive the driving motors 66x, 66y, and 66$\theta$ so as to position the loading table in the correct stop position. Degrees of the movement and turning in the three directions corresponding to the rates of eccentricity are large enough with respect to the degree of deviation ($\pm 15$ mm in the x direction, $\pm 20$ mm in the y direction, and $\pm 2°$ in the $\theta$ direction in this embodiment) and, even when the precision in stopping the guided vehicle is insufficient, the precision in relative position between the loading table and the loading device can be controlled to be within $\pm 1$ mm in the directions x and y as well as within the allowance in the $\theta$ direction.

In this embodiment, since eccentric cams each provided with a ball bearing undergoing external potential pressure at the outer ring thereof are used, a structure of positioning means is simple and backlash between the eccentric cam and the groove therefor is suppressed to ensure smooth positioning.

The cam mechanism as positioning means as used in this embodiment is not necessarily required for the first and second inventive items of the present invention and any mechanism such as using rack pinions, ball screws, or others may suffice as far as being capable of positioning in the three directions x, y, and $\theta$.

Further, a stepping motor is used as a driving motor in this embodiment, however, any kind of motor capable of position-controlling such as a servomotor equipped with an encoder may fulfill the purpose for any of three inventive items of the present invention.

Also, in this embodiment, the optical sensors are disposed at equal distances from the center of the body of the vehicle, however, it is needless to say that they may be located in any position with respect to the body of the vehicle as far as being capable of detecting the aforesaid degree of positional deviation.

As has hitherto been described in detail, according to the method for positioning the automatic guided vehicle as the second item of the invention, positioning means capable of positioning the loading table with high precision in three directions including two on a horizontal plane and a rotational one around a vertical axis are provided, the optical sensors detect degrees of deviation between a fixed stop position and a stop position of the guided vehicle, positioning correction values in the three directions are computed based on the result of detection for positioning of the loading table, whereby positioning of the automatic guided vehicle can be performed with a simple structure without requiring attendant at low cost with high precision.

In the automatic guided vehicle as the first item of the invention, the loading table is provided with a positioning device with high precision in three directions including two on a horizontal plane and a rotational one around a vertical axis, therefore, a stop point of the loading table can be positioned with high precision by a simple structure at low cost.

In addition, in the loading table as the third item of the invention, positioning in three directions including two on a horizontal plane and a rotational one around a vertical axis is performed by the driving parts using eccentric cams whose outer peripheries are subjected to external potential pressure, whereby a stop point can be positioned by a structure having small size, light weight, and high precision at low cost.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An automatic guided vehicle which runs along a predetermined running course comprising:
    a loading table coupled to the guided vehicle, said guided vehicle provided with positioning means for adjusting a position of said loading table relative to said guided vehicle;
    mark-detecting means, coupled to said guided vehicle, for detecting positioning marks disposed relative to said running course, said positioning marks representative of a desired orientation for said loading table;
    means, coupled to said guided vehicle, for computing a first deviation between a position represented by said detected positioning marks and a position of said automatic guided vehicle, said first deviation representative of a second deviation between said desired orientation for said loading table and an actual orientation of said loading table; and
    means, coupled to said loading table and said computing means, for controlling said positioning means to reduce said second deviation.

2. The automatic guided vehicle as set forth in claim 1, wherein said positioning means comprises:
    a plurality of driving parts including a plurality of eccentric cams and driving devices to drive said eccentric cams for displacing said loading table relative to said guided vehicle; and
    a plurality of follower parts each of which has a cam groove to preload upon an outer periphery of particular ones of said eccentric cams of said plurality of driving parts, respectively to cause said plurality of eccentric cams to turn therein.

3. The automatic guided vehicle as set forth in claim 1, wherein said mark-detecting means comprises a TV camera.

4. A method for positioning an automatic guided vehicle, comprising the steps of:
providing an automatic guided vehicle having a loading table adjustable relative to said automatic guided vehicle by a positioning means, said loading table disposed to be loaded with an article, said automatic guided vehicle automatically runs, and stops;
targeting positioning marks representative of a desired orientation of said loading table when said automatic guided vehicle stops;
detecting a first deviation between an orientation of said automatic guided vehicle and said positioning marks said first deviation representative of a second deviation between said desired orientation and an actual orientation of said loading table; and
driving said positioning means to reduce said second deviation.

5. The positioning method as set forth in claim 4, wherein said positioning means comprises:
a plurality of driving parts including a plurality of eccentric cams and driving devices to drive said eccentric cams for displacing said loading table relative to said guided vehicle; and
a plurality of follower parts each of which has a cam groove to preload an outer periphery of particular ones of said eccentric cams of said plurality of driving parts, respectively to cause said plurality of eccentric cams to turn therein.

6. The positioning method as set forth in claim 4, wherein said said targeting step is performed by a TV camera.

7. A loading table provided on an automatic guided vehicle comprising:
a turning table rotatable around a substantially vertical axis;
a first and a second moving table independently movable in two directions on a substantially horizontal plane;
a plurality of driving parts, coupled to said automatic guided vehicle, said turning table, and said first moving table, said plurality of driving parts include a plurality of eccentric cams and driving devices for rotating said eccentric cams; and
a plurality of follower parts, coupled to said turning table, said first moving table, and said second one, said plurality of follower parts have cam grooves to preload an outer periphery of particular ones of said eccentric cams of said plurality of driving parts, respectively and to cause said eccentric cams to turn therein.

8. The automatic guided vehicle of claim 1 wherein said loading table is disposed substantially in a horizontal plane and said positioning means comprises means for adjusting said loading table in said horizontal plane.

9. The automatic guided vehicle of claim 1 wherein said positioning means further comprises means for adjusting a rotational orientation of said loading table normal to said horizontal plane.

* * * * *